United States Patent
Classen et al.

(10) Patent No.: US 8,479,555 B2
(45) Date of Patent: Jul. 9, 2013

(54) METHOD FOR COMPENSATING FOR QUADRATURE

(75) Inventors: Johannes Classen, Reutlingen (DE); Christoph Gauger, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 12/645,010

(22) Filed: Dec. 22, 2009

(65) Prior Publication Data

US 2011/0153251 A1    Jun. 23, 2011

(30) Foreign Application Priority Data

Jan. 29, 2009   (DE) .......................... 10 2009 000 475

(51) Int. Cl.
*G01P 21/00* (2006.01)
(52) U.S. Cl.
USPC ........................................................... 73/1.37
(58) Field of Classification Search
USPC ........................................................... 73/1.37
See application file for complete search history.

(56) References Cited

U.S. PATENT DOCUMENTS

| | | | | |
|---|---|---|---|---|
| 6,553,833 | B1 * | 4/2003 | Funk et al. | 73/504.14 |
| 7,313,958 | B2 * | 1/2008 | Willig et al. | 73/504.12 |
| 7,316,161 | B2 * | 1/2008 | Willig et al. | 73/504.12 |
| 7,523,663 | B2 * | 4/2009 | Willig et al. | 73/504.12 |
| 2004/0123660 | A1 * | 7/2004 | Willig et al. | 73/504.12 |
| 2004/0206176 | A1 * | 10/2004 | Willig et al. | 73/504.12 |
| 2006/0191338 | A1 * | 8/2006 | Willig et al. | 73/504.12 |
| 2007/0234803 | A1 * | 10/2007 | Gomez et al. | 73/504.12 |
| 2011/0126621 | A1 * | 6/2011 | Neul | 73/504.12 |

* cited by examiner

*Primary Examiner* — Hezron E Williams
*Assistant Examiner* — Rodney T Frank
(74) *Attorney, Agent, or Firm* — Kenyon & Kenyon LLP

(57) ABSTRACT

A method for compensating for the quadrature of a micromechanical structure, the micromechanical structure having a substrate having a main extension plane, a seismic mass that is attached by spring elements to the substrate, and first and second compensation electrodes anchored to the substrate; in response to application of a first quadrature voltage between the first compensation electrode and the seismic mass, a first compensation force being produced on the seismic mass and, in response to application of a second quadrature voltage between the second compensation electrode and the seismic mass, a second compensation force being produced on the seismic mass and, in addition, the second quadrature voltage being adjusted as a function of the first quadrature voltage.

9 Claims, 4 Drawing Sheets

METHOD FOR COMPENSATING FOR QUADRATURE

BACKGROUND INFORMATION

PCT International Patent Publication No. WO 03/058 167 describes a rotation-rate sensor having a substrate and a Coriolis element, the Coriolis element being excitable to vibrate in parallel to a first axis, a deflection of the Coriolis element being provided in response to a Coriolis force in a second axis perpendicular to the first axis, and the rotation-rate sensor having force-mediating means between the substrate and the Coriolis element in the form of compensation structures provided for compensating for quadrature. The Coriolis element includes a seismic mass which has a plurality of cutouts. The compensation structures include first and second electrodes which are anchored to the substrate and project perpendicularly to the substrate surface, each into a cutout of the frame. The inner periphery of the cutout is asymmetrical in shape, so that, by suitably connecting the first or the second electrodes, a first or second compensation force of the frame relative to the substrate is produced in the one direction in parallel or, in the other direction, antiparallel to the detection direction, the force increasing proportionally to the deflection of the driving vibration. Therefore, to generate the particular compensation force, only one of the first and second electrodes is connected in each case, while the other one of the first and second electrodes is not connected or is only connected by application of a weak voltage. These particular compensation forces are able to compensate for an unwanted transversal force on the frame in parallel to the detection direction, referred to in the following as quadrature force, that is produced by the driving motion (quadrature compensation). Such quadrature forces arise due to sensor design imperfections inherent in the manufacturing, and they lead to a modulation of the Coriolis detection signals by the drive frequency and thus to unwanted offset signals in the detection branch.

The quadrature is disadvantageously altered by external influences (such as temperature variations or substrate deformations caused by package stress, for example), so that it is necessary to raise or reduce the first and second quadrature voltage accordingly to circuit-connect the first and second electrodes. However, this also leads to a change in the effective spring stiffness of the detection structure, which is dependent, on the one hand, on the mechanical stiffness of the detection springs, on the other hand, however, also on the electrical connection of all electrodes in the detection circuit, thus, in particular, also on the quadrature voltages, whereby the resonant frequency of the detection mode shifts, in turn. This is referred to in the following as positive feedback. For that reason, to permit operation of the rotation-rate sensor at full resonance, i.e., for the detection frequency to equal the drive frequency, the detection voltages must be adapted accordingly. Particularly in view of relatively substantial positive feedback effects, in combination with manufacturing tolerances, the result is that an operation of the rotation-rate sensor at full resonance cannot be ensured at all times, so that the detection sensitivity, respectively the signal-to-noise ratio of the rotation-rate sensor is degraded.

SUMMARY OF THE INVENTION

The method for compensating for quadrature according to the present invention has the advantage over the related art in that a change in the positive feedback is largely suppressed in response to a change in the corresponding quadrature voltages. This is accomplished by adjusting or modifying the second quadrature voltage as a function of the first quadrature voltage, i.e., by connecting both the first, as well as the second quadrature voltage, even when only one compensation force is to be produced on the seismic mass in one direction. In this context, the first and second quadrature voltage are adjusted in mutual dependency. By selecting a suitable ratio between the first and the second quadrature voltage, a desired compensation force is advantageously produced and, at the same time, the influences of the changes in the first and second quadrature voltage on the spring constant of the spring elements are compensated in such a way that the spring constant remains substantially constant. This is achieved in that a first change in the positive feedback effect resulting from a first modification to the first quadrature voltage is compensated as a function of a second opposite change in the positive feedback effect resulting from a corresponding second modification to the second quadrature voltage, so that the overall balance of the positive feedback effect remains substantially the same. As a result, there is no need for a relatively costly correction of the residual voltage level in the detection circuit, and thus an operation of the micromechanical structure at full resonance is ensured in a simple manner. Thus, in particular, micromechanical structures having completely different ratios of the positive feedback capabilities of the compensation electrodes to the total feedback capability of the other electrodes that are active in the detection circuit may also be reliably operated at full resonance using one and the same evaluation circuit.

One preferred embodiment provides for the second quadrature voltage to be adjusted in a clocked cycle or continuously as a function of the first quadrature voltage, so that a quadrature compensation of the micromechanical structure is advantageously carried out on a virtually permanent basis by modifying or connecting the first and second compensation electrodes accordingly.

One preferred embodiment provides for the second quadrature voltage to be adjusted in such a way that the sum of the square of the first quadrature voltage and the square of the second quadrature voltage is essentially always constant. Thus, it is particularly beneficial that the change in the positive feedback effect is minimized as a function of the respective individual first or second quadrature voltage, since the positive feedback effect is essentially solely dependent on the sum of the square of the first quadrature voltage and the square of the second quadrature voltage. At the same time, a quadrature compensation may be performed by adjusting the first and second quadrature voltages accordingly, since, in contrast to the positive feedback effect, the quadrature compensation is essentially dependent on the difference between the square of the first quadrature voltage and the square of the second quadrature voltage.

Another preferred embodiment provides for the second quadrature voltage to be calculated as a function of the first quadrature voltage, the function decreasing monotonically between a minimum voltage of the first quadrature voltage and a maximum voltage of the first quadrature voltage. Thus, it is especially beneficial that the second quadrature voltage is the inverse of the first quadrature voltage, so that, in response to an increase in the one quadrature voltage (increase in the positive feedback effect of the first quadrature voltage), the other quadrature voltage is automatically reduced (reduction in the positive feedback effect of the second quadrature voltage), and thus the sum of the squares of both quadrature voltages essentially remains constant, thereby minimizing the change in the feedback effect.

Another preferred embodiment provides for the second quadrature voltage to be adjusted as a function of a root function of the first quadrature voltage, so that an analytical rule of assignment that is relatively simple to realize is advantageously derived for adjusting the first and second quadrature voltages; at the same time, the above-mentioned mathematical condition whereby the sum of the square of the first quadrature voltage and the square of the second quadrature voltage should essentially always be constant, being at least approximately automatically satisfied, and thus the change in the positive feedback effects being minimized. It is especially preferred that the values of the root function be stored in the form of a "mapping table" from which the relation between the first and the second quadrature voltage is derived. Thus, when the micromechanical structure is implemented on an ASIC, it is especially advantageous that no analytical square root calculations need to be performed on the ASIC. In this context, correspondingly small increments of the values must be selected.

In accordance with another preferred embodiment, the argument of the root function is calculated at least as the difference between the square of a first constant and the square of the first quadrature voltage, the first constant including, in particular, the maximum voltage. Thus, the rule of assignment is normalized very advantageously to the maximum settable voltage at the first compensation electrode. In this case, 0 volt is assumed, in particular, as the minimum voltage.

In accordance with another preferred embodiment, the argument of the root function is calculated from the sum of the square of a first summand, the square of a second summand, and of the square of a third summand, the first summand including the difference between the maximum voltage and an offset voltage, the second summand the difference between the minimum voltage and the offset voltage, and the third summand the difference between the first quadrature voltage and the offset voltage, the root function being added, in particular, to the offset voltage. Thus, the following rule of assignment is derived:

$$U_{50}(U_{40}) = U_{off} + \sqrt{(U_{40,max} - U_{off})^2 + (U_{40,min} - U_{off})^2 - (U_{40} - U_{off})^2}$$

Thus, deviations in the functional relationship between the first and second quadrature voltage are able to be corrected very advantageously in a relatively simple manner in order to minimize the change in the positive feedback effect by adjusting the offset voltage accordingly. Therefore, deviations that arise, in particular, due to a relatively complex clock scheme of the evaluation circuit are able to be corrected. For quadrature electrodes having relatively small quadrature values, it is alternatively provided that the maximum voltage be replaced by a smaller voltage value, thereby reducing the entire positive feedback. Alternatively, in the case that an increase in the total positive feedback effects of the quadrature electrodes is desirable, the minimum voltage is able to be replaced by a larger voltage value. In both of these cases, the voltage values are to be individually determined for the quadrature electrodes in question, for example, by adjusting the micromechanical structure.

In accordance with another preferred embodiment, the first compensation force produces a first compensating motion of the seismic mass along a compensation direction, and the second compensation force produces a second compensating motion of the seismic mass in a direction that is substantially antiparallel to the compensation direction, the compensation direction preferably being oriented perpendicularly and/or in parallel to the main extension plane. Thus, it is particularly advantageous that a quadrature compensation, i.e., an at least virtual isolation of the driving vibration from the detection vibration is made possible, thereby suppressing a direct crosstalk of the driving motion onto the Coriolis detection signal. Thus, the method according to the present invention may be applied very advantageously both to micromechanical structures having a detection direction that is perpendicular to the main extension plane, as well as to micromechanical structures having a detection direction that is parallel to the main extension plane.

In accordance with another preferred embodiment, the method is used to adjust a micromechanical rotation-rate sensor. A risk associated with rotation-rate sensors, in particular, is that the quadrature compensation performed to reduce spurious signals, leads to a frequency shift due to a change in the positive feedback effects, thereby bringing the rotation-rate sensor out of the full resonance region. For that reason, a method for compensating for quadrature that, at the same time, maintains constant positive feedback effects, is especially advantageous, particularly for rotation-rate sensors.

DETAILED DESCRIPTION

Figure 1A:
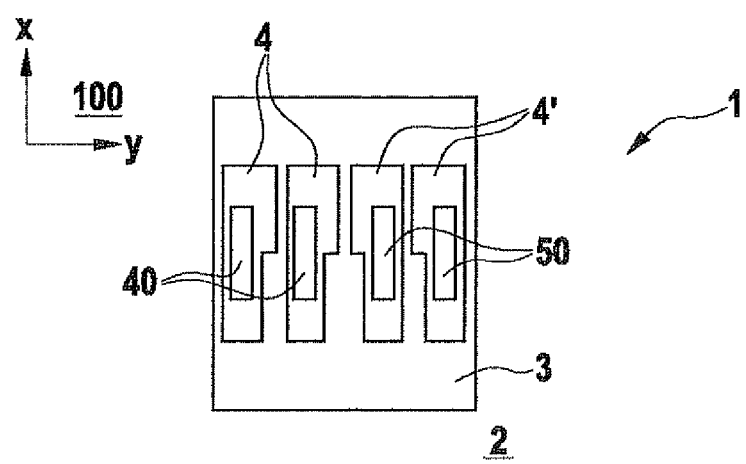
FIGS. 1a through 1c show schematic views of a micromechanical structure in accordance with the related art.
Figure 1B:
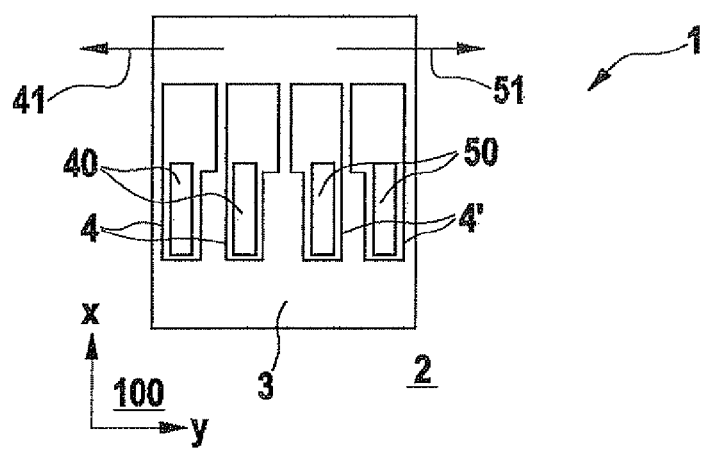
Figure 1C:
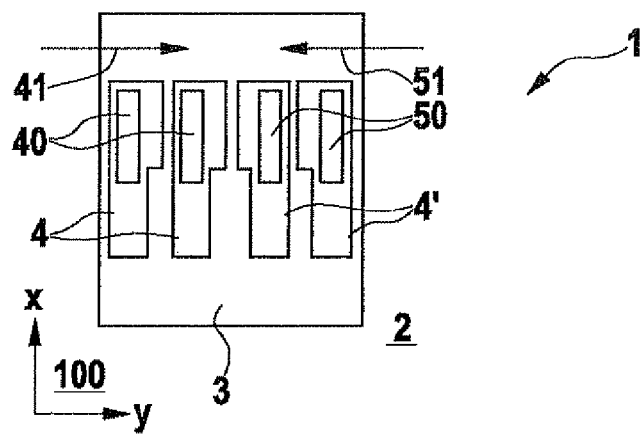

Schematic views of a micromechanical structure 1 in accordance with the related art are shown in FIGS. 1a through 1c, micromechanical structure 1 having a substrate 2 having a main extension plane 100 and a seismic mass 3. In FIGS. 1a, 1b and 1c, only sections of seismic mass 3 are shown, in particular, which are used for quadrature compensation. Seismic mass 3 is flexibly attached to substrate 2 by spring elements (not shown). Seismic mass 3 includes, in particular, a drive frame of a rotation-rate sensor, seismic mass 3 being excited by comb drives (not shown) into a driving vibration in parallel to main extension plane 100. The driving vibration has a drive frequency. In addition, fastened in this case via other spring elements to seismic mass 3 is a Coriolis element (not shown), which, in response to a rotation rate perpendicular or in parallel to main extension plane 100, undergoes a periodic Coriolis acceleration perpendicularly to the driving vibration and perpendicularly to the rotation rate. Included in the consideration of the periodic Coriolis acceleration is the detection vibration having a corresponding detection frequency. To maximize the signal-to-noise ratio, the rotation-rate sensor is operated at full resonance, i.e., the frequency of the drive mode and the detection mode are brought into conformity. Since, when driven by the driving vibration, seismic mass 3 is also subject to vibrational components perpendicular to the driving direction, the rotation-rate sensor must be quadrature-compensated in order to increase the signal-to-noise ratio. This is accomplished by a suitable connection of first and second compensation electrodes 40, 50 to first and second quadrature voltages $U_{40}$, $U_{50}$. To this end, first and second compensation electrodes 40, 50 are anchored to substrate 2 and, in each instance, project into a first and second cutout 4, 4' of seismic mass 3, perpendicularly to main extension plane 100. First and second cutout 4, 4' each have a substantially rectangular inner contour, a step being configured on one side of first and second cutout 4, 4'. First and second cutouts 4, 4' are configured in mirror symmetry, first compensation electrodes 40 being located in first cutouts 4, and second compensation electrodes 50 being located in second cutouts 5.

In FIG. 1a, seismic mass 3 is shown in a position of rest without any applied driving voltage. In FIG. 1b, seismic mass 3 is moved by the driving voltage along first direction X. At this point, due to the edge in first cutout 4, a first quadrature voltage $U_{40}$ between first compensation electrode 40 and seismic mass 3 would produce a first compensation force 41 along second direction Y. On the other hand, due to the opposite edge in second cutout 4', a second quadrature voltage $U_{50}$ applied between second compensation electrode 50 and the seismic mass 3 would produce a second compensation force 51 along second direction Y counter to first compensation force 41. Analogously, in FIG. 1c, seismic mass 3 is deflected in the opposite direction along first direction X, so that the algebraic signs of first and second compensation forces 41, 51 are inverted correspondingly. In this manner, in accordance with the related art, either first or second compensation electrode 40, 50 are connected for purposes of quadrature compensation.

The related-ad design of micromechanical structure 1 is merely exemplary and in no way limits the applicability of the quadrature compensation method according to the present invention to such micromechanical structures 1. Rather, an implementation of the method according to the present invention is also provided for micromechanical structures 1 which have a detection direction perpendicular to main extension plane 100, in this case, first and second compensation electrodes 40, 50 preferably being configured perpendicularly to main extension plane 100 between substrate 2 and seismic mass 3, thereby allowing first and second compensation forces 41, 51 to act on seismic mass 3, likewise substantially perpendicularly to main extension plane 100.

Figure 2A:
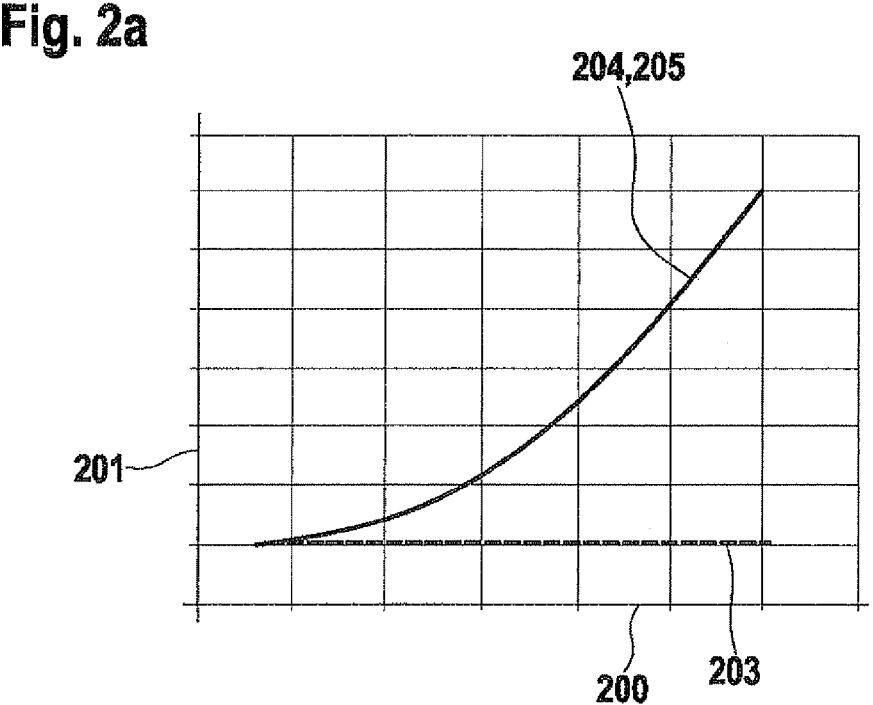
FIGS. 2a and 2b schematically show a characteristic curve of the quadrature compensation and of the positive feedback in the case of a micromechanical structure in accordance with the related art.
Figure 2B:
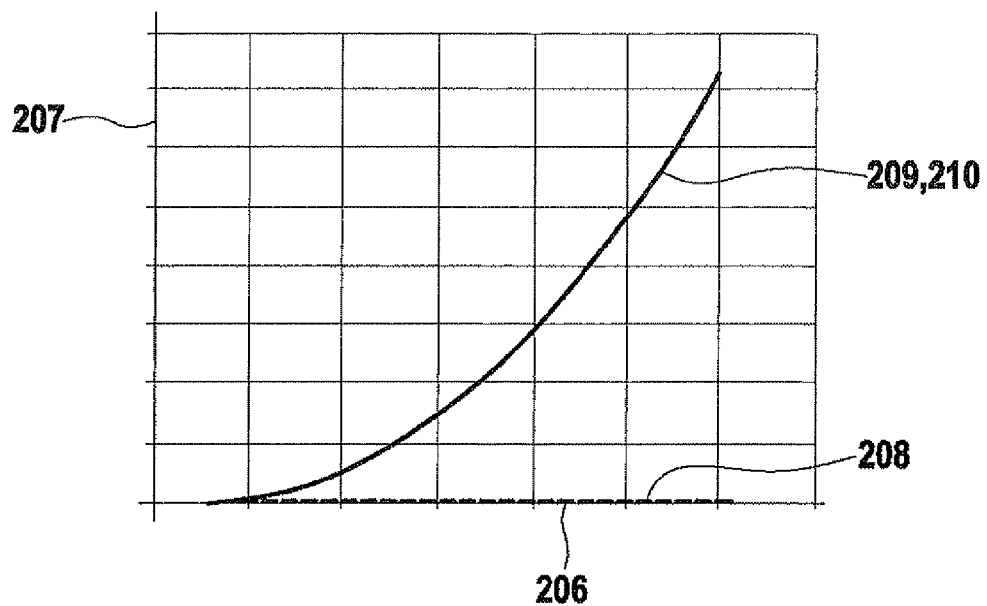

FIGS. 2a and 2b schematically show a characteristic curve of the quadrature compensation and a characteristic curve of the positive feedback, in each case as a function of first quadrature voltage $U_{40}$. In FIG. 2a, first quadrature voltage $U_{40}$ is represented on abscissa 200, and the compensated quadrature is represented in "full scale" units on ordinate 201. First curve 203 indicates the second quadrature as a function of second quadrature voltage $U_{50}$ which is assumed to be constant in accordance with the related art. Second curve 204 indicates the rising first quadrature as a function of first quadrature voltage $U_{40}$. The total quadrature compensation is illustrated by third curve 205. It is discernible that second quadrature voltage $U_{50}$ does not contribute appreciably to the total quadrature compensation. Analogously, in FIG. 2b, first quadrature voltage $U_{40}$ is represented on abscissa 206, and the positive feedback in units of frequency on ordinate 207. Fourth curve 204 shows the second positive feedback as a function of second quadrature voltage $U_{50}$ which is assumed to be constant in accordance with the related art. Fifth curve 209 shows the rising first positive feedback as a function of first quadrature voltage $U_{40}$, while the total positive feedback is illustrated by sixth curve 210. It is discernible that the total positive feedback is determined solely by first quadrature voltage $U_{40}$.

Figure 3:
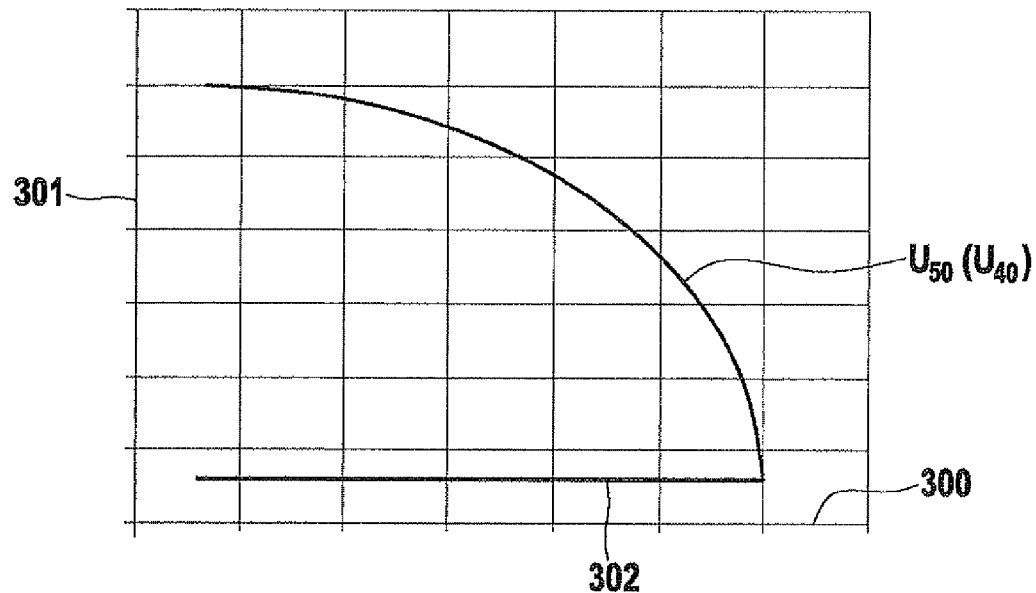
FIG. 3 schematically shows a characteristic curve of the second quadrature voltage in the case of a micromechanical structure in accordance with a first specific embodiment of the present invention.

FIG. 3 schematically shows a characteristic curve of second quadrature voltage $U_{50}$ in the case of a micromechanical structure 1 in accordance with a first specific embodiment of the present invention, the schematic curve of second quadrature voltage $U_{50}$ being shown as a root function of first quadrature voltage $U_{40}$. First quadrature voltage $U_{40}$ is plotted on abscissa 300, and second quadrature voltage $U_{50}$ on ordinate 301. It is discernible that second quadrature voltage $U_{50}$ falls strictly monotonically as a function of rising first quadrature voltage $U_{40}$. As a comparison, as seventh curve 302, the second quadrature voltage in accordance with the related art is shown, that is constant and is independent of the first quadrature voltage.

Figure 4:
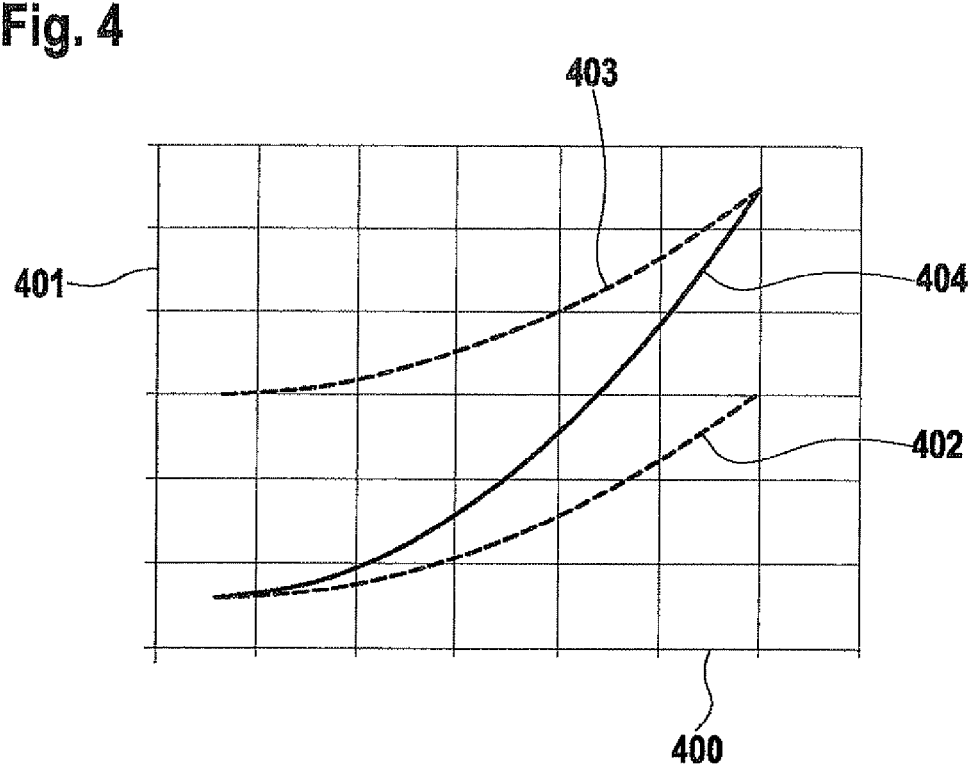
FIG. 4 schematically shows a characteristic curve of the quadrature voltage in the case of a micromechanical structure in accordance with a second specific embodiment of the present invention.

FIG. 4 schematically shows a characteristic curve of the quadrature for a micromechanical structure 1 in accordance with a second specific embodiment of the present invention, first quadrature voltage $U_{40}$ being plotted on abscissa 400, and the quadrature compensation being plotted in "full scale" units on ordinate 401. In this case, second quadrature voltage $U_{50}$ has the following functional dependence on first quadrature voltage $U_{40}$:

$$U_{50}(U_{40}) = U_{off} + \sqrt{(U_{40,max} - U_{off})^2 + (U_{40,min} - U_{off})^2 - (U_{40} - U_{off})^2}$$

In this context, an eighth curve 402 shows a first quadrature compensation as a function of first quadrature voltage $U_{40}$, and a ninth curve 403 shows a second quadrature compensation as a function of second quadrature voltage $U_{50}$. The sum of the quadrature compensations is illustrated as total quadrature compensation by tenth curve 404. It is discernible that the total quadrature compensation is produced at this point both by the first, as well as by the second quadrature voltage $U_{40}$, $U_{50}$.

Figure 5:
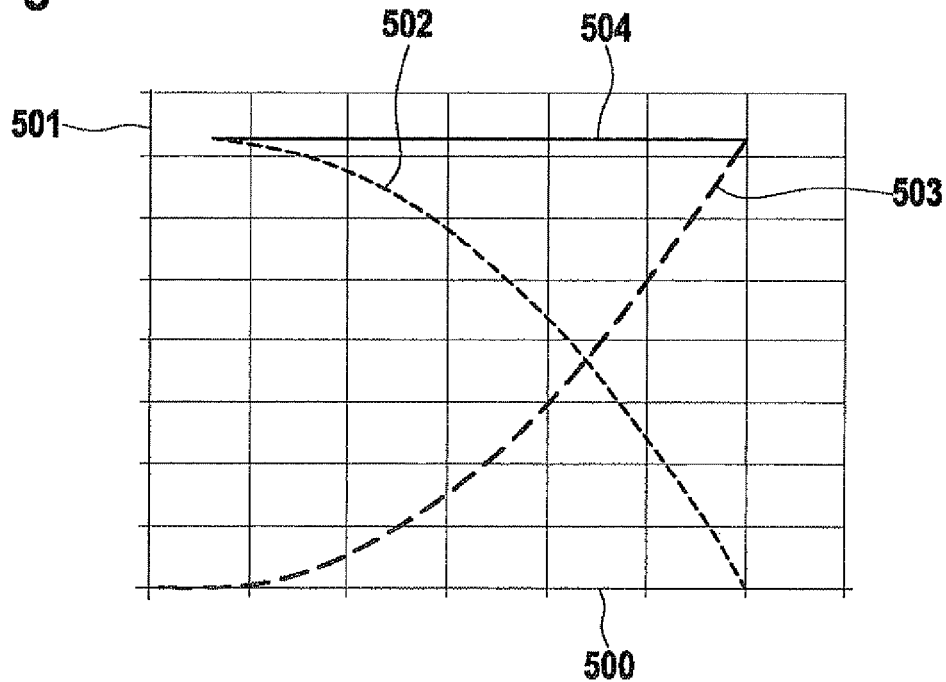
FIG. 5 schematically shows a characteristic curve of the positive feedback in the case of a micromechanical structure in accordance with the second specific embodiment of the present invention.

FIG. 5 schematically shows a characteristic curve of the positive feedback for a micromechanical structure 1 in accordance with the second specific embodiment of the present invention, first quadrature voltage $U_{40}$ being plotted on abscissa 500, and the positive feedback being plotted in frequency units on ordinate 501. Eleventh curve 502 shows the second positive feedback as a function of second quadrature voltage $U_{50}$ which decreases with increasing first quadrature voltage $U_{40}$. Twelfth curve 503 illustrates the first positive feedback as a function of first quadrature voltage $U_{40}$. The first positive feedback increases with rising first quadrature voltage $U_{40}$, so that the decline of the second positive feedback is directly compensated by the rising of the first positive feedback. Therefore, the total positive feedback, which is illustrated by thirteenth curve 504, is constant.

Figure 6:
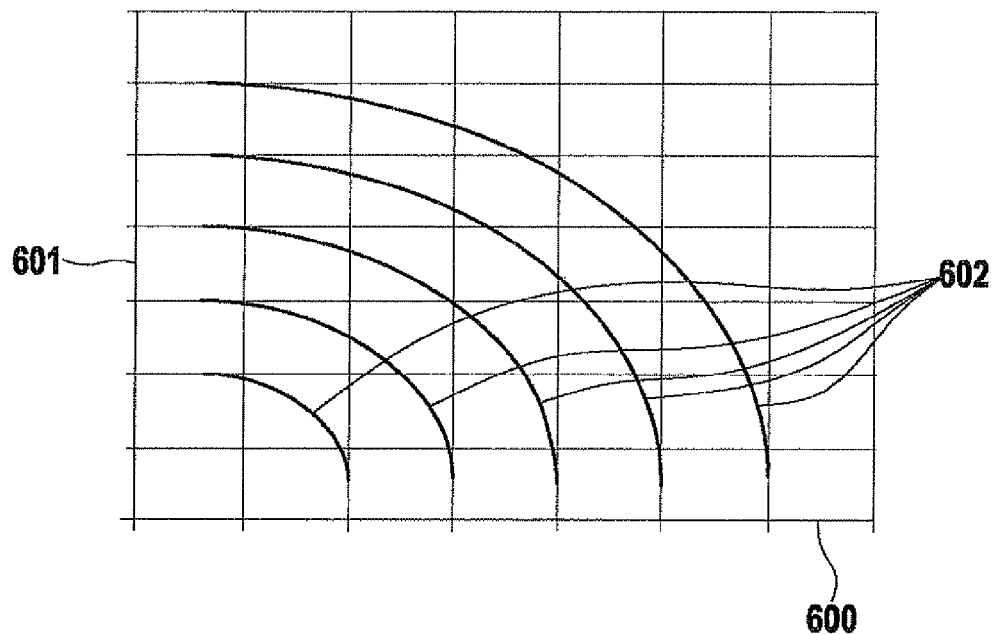
FIG. 6 schematically shows characteristic curves of second quadrature voltages in the case of a micromechanical structure in accordance with the second specific embodiment of the present invention.

FIG. 6 schematically shows characteristic curves of second quadrature voltages $U_{50}$ in the case of a micromechanical structure in accordance with the second specific embodiment of the present invention. In this context, first quadrature voltage $U_{40}$ is plotted on abscissa 600, and second quadrature voltage $U_{50}$ on ordinate 601. FIG. 6 shows a group of curves 602 of second quadrature voltages $U_{50}$, in each case as a function of first quadrature voltage $U_{40}$ and as a function of various maximum voltages $U_{40,max}$ which are individually selectable when adjusting micromechanical structure 1.

What is claimed is:

1. A method for compensating for a quadrature of a micromechanical structure, the micromechanical structure having a substrate having a main extension plane, a seismic mass that is attached by spring elements to the substrate, and first and second compensation electrodes anchored to the substrate, the method comprising:
   in response to an application of a first quadrature voltage between the first compensation electrode and the seismic mass, producing a first compensation force on the seismic mass;
   in response to an application of a second quadrature voltage between the second compensation electrode and the seismic mass, producing a second compensation force on the seismic mass; and
   adjusting the second quadrature voltage as a function of the first quadrature voltage.

2. The method according to claim 1, wherein the second quadrature voltage is adjusted in a clocked cycle or continuously as a function of the first quadrature voltage.

3. The method according to claim 1, wherein the second quadrature voltage is adjusted in such a way that a sum of a square of the first quadrature voltage and a square of the second quadrature voltage is substantially always constant.

4. The method according to claim 1, wherein the second quadrature voltage is calculated as a function of the first quadrature voltage, the function decreasing monotonically at least between a minimum voltage of the first quadrature voltage and a maximum voltage of the first quadrature voltage.

5. The method according to claim 1, wherein the second quadrature voltage is adjusted as a function of a root function of the first quadrature voltage.

6. The method according to claim 5, wherein an argument of the root function is calculated at least as a difference between a square of a first constant and a square of the first quadrature voltage, the first constant including a maximum voltage.

7. The method according to claim 5, wherein an argument of the root function is calculated from a sum of a square of a first summand, a square of a second summand, and of a square of a third summand, the first summand including a difference between a maximum voltage and an offset voltage, the second summand including a difference between a minimum voltage and the offset voltage, and the third summand including a difference between the first quadrature voltage and the offset voltage, the root function being added to the offset voltage.

8. The method according to claim 1, wherein the first compensation force produces a first compensating motion of the seismic mass along a compensation direction, and the second compensation force produces a second compensating motion of the seismic mass in a direction that is substantially antiparallel to the compensation direction, the compensation direction being oriented perpendicularly or in parallel to the main extension plane.

9. The method according to claim 1, wherein the method is used to adjust a micromechanical rotation-rate sensor.

* * * * *